United States Patent [19]

Jones et al.

[11] Patent Number: 5,724,340
[45] Date of Patent: Mar. 3, 1998

[54] APPARATUS AND METHOD FOR AMPLITUDE TRACKING

[75] Inventors: Robert V. Jones, Bountiful; Richard J. Saggio, Salt Lake City; John W. Zscheile, Jr., West-Farmington, all of Utah

[73] Assignee: Unisys Corporation, Blue Bell, Pa.

[21] Appl. No.: 382,738

[22] Filed: Feb. 2, 1995

[51] Int. Cl.$^6$ ............................................ H04J 13/00
[52] U.S. Cl. ........................... 370/203; 370/527; 375/206
[58] Field of Search ................................. 370/203, 204, 370/335, 320, 441, 527; 332/155, 157; 375/200, 206; 364/715.06, 715.07, 724.01, 724.03, 745

[56] References Cited

U.S. PATENT DOCUMENTS

| | | | |
|---|---|---|---|
| 5,073,899 | 12/1991 | Collier et al. | 370/203 |
| 5,081,645 | 1/1992 | Resnikoff et al. | 370/203 |

*Primary Examiner*—Chau Nguyen
*Attorney, Agent, or Firm*—John B. Sowell; Mark T. Starr; John F. O'Rourke

[57] ABSTRACT

Apparatus and method are provided for adaptively modulating or combining a first signal with a second signal. A series of values of the first signal are taken and sequentially stored in a shift register. The maximum absolute value of the oldest N values (where N is an integer) stored in the shift register is then determined. Before, during or after that determination, the maximum absolute value of the remaining (newer) series of values of the shift register is also determined. The lesser of those two maximum absolute values is then determined. This lesser maximum absolute value is then multiplied by a gain factor representing the desired gain to produce a scale factor. The gain factor can be a preset constant, or can be based on the steady-state ratio of the power of the second signal to the power of the first signal. The second signal is then multiplied by the scale factor to produce a scaled signal. Meanwhile, the first signal has been delayed by an amount representative of the total time duration of the first N values in the shift register, or of the total time needed to obtain those first N values, or of the duration of the portion of the signal represented by those first N values. Considering the two peaks separately, combined with using this delay, in effect enables the resulting amplitude tracking to consider prospective as well as past values of the first signal. The scaled signal is then added to the delayed first signal. The amplitude of the scaled second signal thereby tracks the amplitude of the corresponding portion of the first signal, so that the scaled second signal cannot be readily detected unaided during any relatively low amplitude portion of the first signal.

10 Claims, 6 Drawing Sheets

APPARATUS AND METHOD FOR AMPLITUDE TRACKING

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

FIELD OF THE INVENTION

The present invention relates to communications, and more particularly to signal modulation for communications. The present invention also relates to signal modulation in general, and to signal identification.

BACKGROUND OF THE INVENTION

Local area networks (LANs) employing a shared bus master ring and interface units are known. In one prior art system, the LAN stations contend for use of the bus. Such LAN interface units employ a protocol including a plurality of auxiliary bits in the message such as sync or header bits which are used to identify the start of the message and in some cases the message link. This is followed by source and/or destination bits which identify the address of the unit for which the data is intended. The source bits are followed by data, which is optionally followed by a message trailer or end of message bits. Some Time Division Multiple Access (TDMA) mode of operation networks employ predetermined time slots for each user station on a network.

In some prior art TDMA systems, predetermined time slots were generated for each user station on the network.

Besides the TDMA tagging described above, another approach is with code division multiple access (CDMA). In a CDMA system, each transmitting station modulates the data that it sends by a respective spreading code which is unique to that station. Modulated data from several such stations can then be sent on a single wireless channel/cable in one frequency band to the receiving station, with all of the CDMA signals combined in that transmission. At the receiving station, the data from any one particular transmitting station can be recovered by multiplying the transmitted composite CDMA signal by the same spreading code(s) which that one particular transmitting station used. One example of a prior art CDMA communication system is described in U.S. Pat. No. 4,908,836 issued Mar. 13, 1990 for "Method and Apparatus for Decoding Multiple Bit Sequences that are Transmitted Simultaneously in a Single Channel" by Craig K. Rushforth et al. Another CDMA communication system is described in U.S. Pat. No. 5,031,173 issued Jul. 9, 1991 for "Decoder for Added Asynchronous Bit Sequences" by Robert T. Short et al.

Signal spreading, or spread-spectrum signals, have been formed by mixing or multiplying a pseudonoise code or signal with the data or other signal to be communicated.

Various applications require appending a code to, or applying a signal to, a data signal in order to identify that signal, its source, etc. U.S. Pat. No. 5,339,312 issued Aug. 16, 1994 for "Station Interface Unit" by Laurence D. Sawyer et al involves applying appropriate identification tags to data before it is time multiplexed. An interface unit is described therein for receiving a stream of parallel bit words from a source bus comprising an address field, a data field and a clock field. The parallel bit words are first phase adjusted and stored in an input register where the address field is compared in enable logic to determine whether to store the data field in a sink buffer register for processing. The word in the input register is coupled to the buffer storage register. The address field is further compared in passthrough disable logic to determine whether to pass the address and data field to an output register or to generate a null code address in the address field of the word being outputted from the buffer storage register. The word in the buffer storage register is coupled through a word selector to an output register. A host source is also coupled to the word selector so that a source word may be written into the output register when a null code address is appended to a parallel bit word being supplied as an input to that word selector.

U.S. Pat. No. 5,231,400 issued Jul. 27, 1993 for "Covert Electronic Battlefield Identification System" by Richard B. Mouldin et al uses pseudonoise spreading codes in an electronic battlefield identification system to permit identification. An electronic identification system is described for use by vehicles on a battlefield. This system comprises an interrogator circuit in an attack vehicle and a transponder circuit in several other vehicles which are friendly but could be mistaken for the enemy. This is particularly useful for identification friend or foe (IFF) applications. In operation, the interrogator circuit transmits a time shifted code which is difficult for an actual enemy to detect and/or jam, and which causes the transponder circuits to send a response from only a selected one of the other friendly vehicles that is being examined by the attack vehicle as a target.

SUMMARY OF THE INVENTION

Accordingly, an object of the present invention is to add an identification or other signal or field to a data signal without perceptibly degrading either signal.

Another object of the present invention is to modulate an identification signal which can then be applied to another signal which it is intended to identify.

A further object of the present invention is to track the amplitude or some other characteristic of one signal and to modify or modulate another signal based thereon so that the amplitude or other characteristic of the second signal tracks that of the first signal.

Still another object of the present invention is to provide amplitude tracking of one signal to control amplitude of another signal before the two signals are combined to produce a composite signal.

A still further object of the present invention is to modulate a sub-audible identification signal without perceptible degradation to the primary audio signal with which that identification signal is then to be combined.

Briefly, these and other objects of the present invention are accomplished by apparatus and method for combining a first signal with a digital signal, such as for modulation or identification. The first signal can also be a digital signal, or it can instead be an analog signal that has been first passed through an analog-to-digital converter. The digital signal is then multiplied by a time varying gain factor whose value is based on that of the digital form of the first signal. The digital signal so scaled is then added to the digital form of the first signal to produce a combined or modulated signal. If the first signal was originally an analog signal, or if so desired, the combined signal can then be digital-to-analog converted to produce an analog signal.

Other objects, advantages and novel features of the invention will become apparent from the following detailed description of the invention when considered in conjunction with the accompanying drawings.

DESCRIPTION OF THE PREFERRED EMBODIMENT

Figure 1:
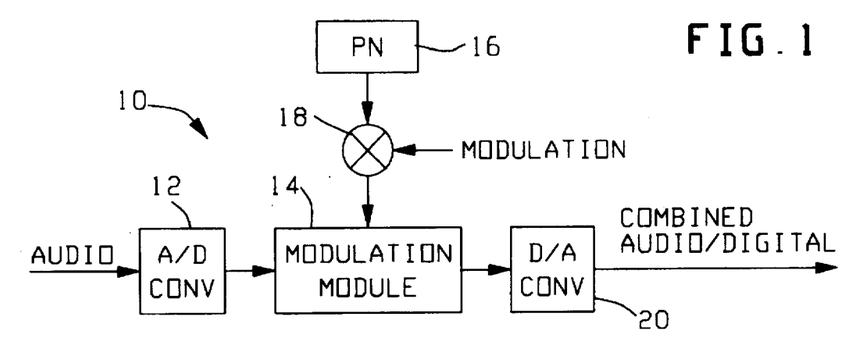
FIG. 1 is a block diagram of a modulator according to the present invention.

Referring now to the drawings, wherein like reference characters designate like or corresponding parts throughout the several views, there is shown in FIG. 1 a preferred amplitude tracking sub-audible modulator 10 wherein digital data is first read and then combined with an audio signal. In this manner, digital data can be added to an audio signal while preserving the audio quality over a high dynamic range. In sub-audible modulation, a digital signal is added to an already existing analog signal, such as the audio signal on a television transmission. The digital data needs to have a high enough signal to noise ratio to facilitate accurate demodulation, but also needs to be at a low enough level so that it cannot be heard unaided, even by a discriminating listener.

System 10 includes analog-to-digital converter 12 receiving the audio signal. The output of A/D converter 12 is provided to modulation module 14. A pseudonoise (PN) signal is generated by PN code generator 16. The desired digital identification or modulation signal is preferably modulated by mixing or multiplying it with the pseudonoise signal, using mixer or multiplier 18, to produce a spread signal. However, codes other than PN codes or redundant signals, can be used for this purpose. This spread signal is then provided as the digital modulation signal to module 14. The resulting combined or modulated signal produced by module 14 is then provided to digital-to-analog converter 20, which thus produces an audio signal that has been modulated using the digital signal.

The preferred implementation for the digitized modulation is to mix the digital information with a pseudo-random noise sequence or pseudonoise sequence with a much greater bit rate. An alternate implementation for the digitized modulation is to digitally encode the message with some highly redundant coding sequence. One such approach is to simply send the digital information at a high rate (i.e. the same rate used in the pseudo-random noise or pseudonoise sequence) and to repeat the information M (a positive integer) times. If the repetition rate M is known by the receiver, then the receiver could add the M repetitions and provide the same detection performance as a receiver using the preferred implementation.

FIG. 1 illustrates how modulator 10 can be implemented to combine the audio signal with the sub-audible digital modulation. The audio input to the A/D convertor 12 is the original analog audio signal. The digital modulation provided to module 14 is a digitized version of the digital modulation waveform, as produced by mixer or multiplier 18. Module 14 sets the gain for the digital modulation and combines the digitized audio signal and the digitized modulation waveform. D/A converter 20 outputs an analog signal of the audio signal with the sub-audible digital modulation.

Figure 2:
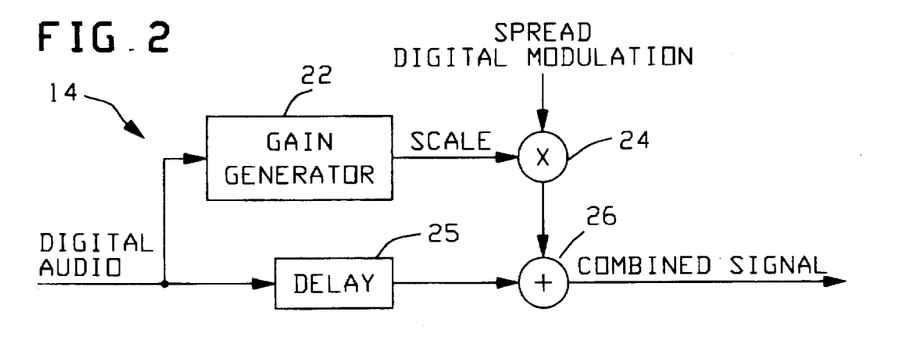
FIG. 2 shows in greater detail a portion of the system of FIG. 1.

Module 14 is illustrated in greater detail in FIG. 2. Module 14 changes the gain of the digital modulation signal so that it corresponds directly to the amplitude of the audio signal. When the amplitude of the audio signal is high, then the amplitude of the digital signal is increased, but still remains practically undetectable unaided. When the amplitude of the audio signal is low, then the amplitude of the digital signal is decreased and remains practically undetectable unaided. Module 14 looks over the amplitude of the audio signal over a time interval long enough so that it does not degrade the digital modulator performance. As described below, module 14 also uses a look-ahead filter and a method to prevent any ringing during abrupt changes in the audio amplitude.

As shown in FIG. 2, the digital modulation provided by mixer or multiplier 18 is gain adjusted (multiplied by a time varying gain factor) and is then added to the audio signal. Module 14 includes gain factor generator 22, mixer or multiplier 24 and summer or adder 26. The digitized audio signal from A/D convertor 12 is provided both to gain factor generator 22 and (after being delayed by delay 25) to summer 26. Gain factor generator 22 determines a time varying gain factor whose instantaneous value at any one time is determined based on instantaneous amplitude samples or digital values of the audio signal taken at different times. The time at which the amplitude of the audio signal is so sampled can be controlled by an appropriate delay. This gain factor is multiplied at mixer 24 with a digital modulation signal from mixer 18, which has the effect of gain adjusting the digital modulation signal, i.e. multiplying the digital modulation signal by a time varying gain factor. The gain-adjusted digital modulation signal is then added by summer 26 to the delayed digital audio signal from A/D convertor 12 via delay 25, to produce the combined or modulated signal that is then provided to D/A convertor 20. System 10 thereby tracks the amplitude of the audio signal, and changes the amplitude of the digital modulation signal to match that of the audio signal.

Figure 3:
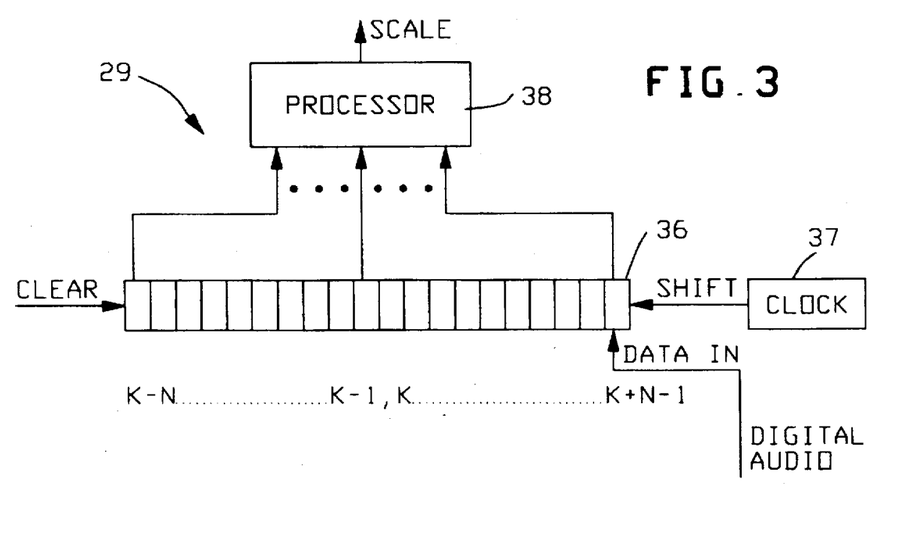
FIG. 3 shows a sliding filter utilized in a portion of the system of FIG. 2.
Figure 4:
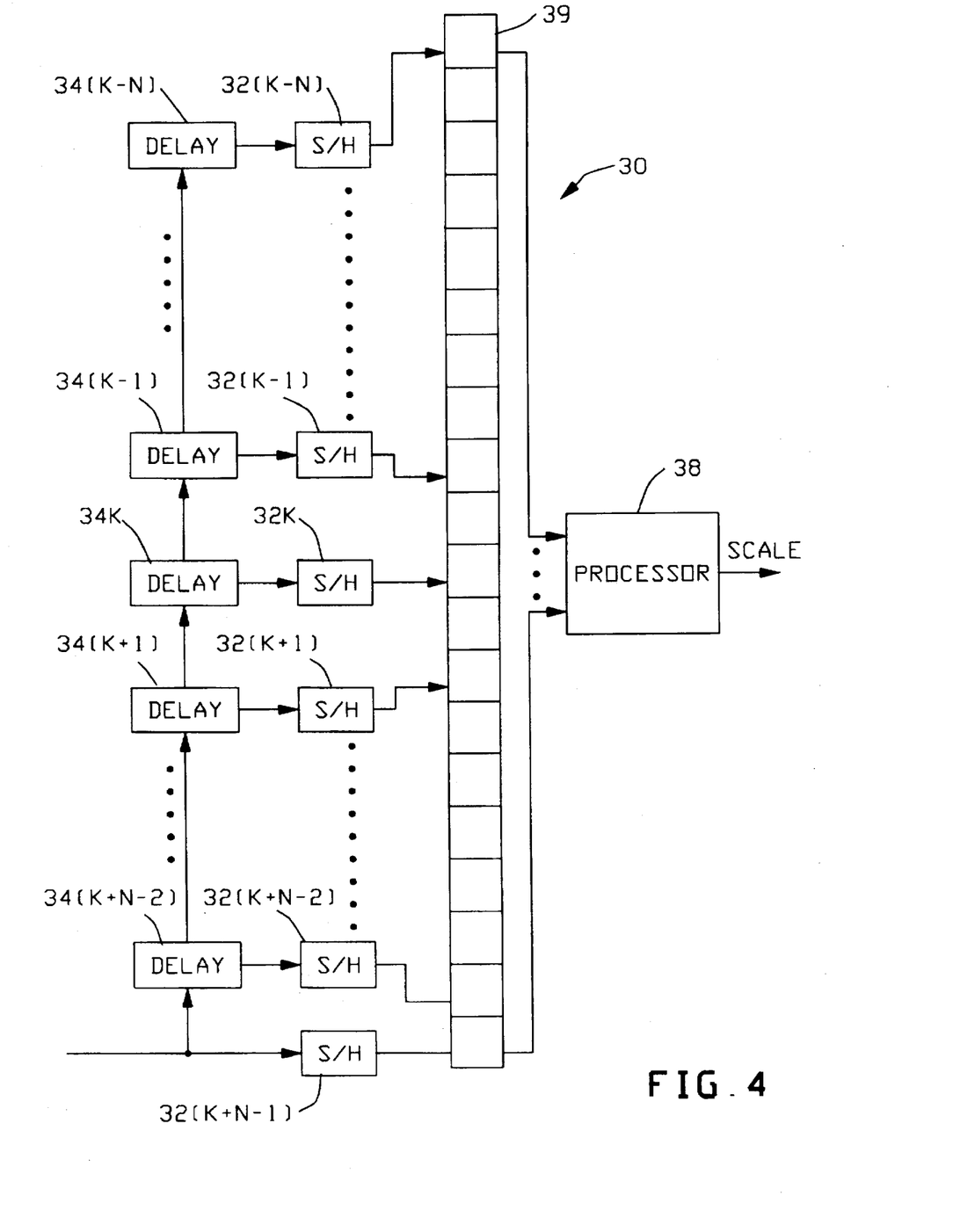
FIG. 4 shows an alternative sliding filter utilized in a portion of the system of FIG. 2.

Gain factor generator 22 determines the gain factor by using the non-linear sliding filter 29 or 30 of FIGS. 3 or 4. The non-linear sliding filter 29 or 30 used in module 14 is used to compute the amplitude scale constant to be applied to the digital modulation signal. Module 14 works with a digitized audio signal using the sliding filter 29 or 30, including a register or buffer 36 or 39, to compute the amplitude scale factor or constant for the digital modulation. Each location K−N, . . . K+N−1 in register or buffer 36 or 39 contains a data byte or word, representative of a single sample or digital value of the audio signal. With sample K as the current sample of the digitized waveform produced by A/D convertor 12, the filter looks at the previous N samples, the current sample K and the next N−1 samples (where K and N are integers). A delay is included in making the last N−1 samples so that the filter can look into the future. The scale constant is then computed and is used to modulate the digital modulation signal at mixer 24. The resulting modulation waveform is then added at summer 26 to the digital audio signal. The resultant signal is then digital-to-analog converted by D/A convertor 20 for use as the combined audio signal.

Gain factor generator 22 can preferably be implemented by the apparatus 29 shown in FIG. 3. Apparatus 29 includes a shift register or buffer array 36, a clock 37 for controlling the shifting the content of register 36 leftward (as shown in FIG. 3) by one place or position, and a processor 38 for producing the scale factor based on the content of register 36. Alternatively, the clock or shift signal could be provided to register 36 directly from processor 38 instead of from a separate clock 37. Initially, the content of register 36 is set or initialized to all zeros (step 41 of FIG. 5). The first digital value or sample of the digitized audio signal from A/D converter 12 is then provided to location K+N−1 of register 36. Between these two above steps, clock 37 (or processor 38) can shift the values in register 36 leftward by one place,before data is first entered in the register; however, obviously such a shift here is not absolutely necessary for proper operation. Processor 38 can now determine the scale factor, if desired, although there is now no need to do so, because register 36 now contains nearly all zeroes. Next, control clock 37 (or processor 38) shifts the values in register 36 leftward by one place, and then the second sample of the digitized audio signal is provided to newly vacated location K+N−1 of register 36. As the process of shift and enter is repeated, register 36 becomes filled with usable data instead of zeroes at all 2N locations. When that happens, then processor 38 would produce a usable scale factor. However, it is not important whether processor 38 waits until data occupies all 2N locations of register 36, because it should take a short time (on the order of milliseconds) to so fill register 36. Processor 38 receives the contents of all 2N locations of register 36, and processes them in the following manner to produce the time varying gain factor SCALE. The preferred method for computing the scale factor using the apparatus of FIG. 3 is as follows:

1. Find the previous maximum (PMAX) which is defined as the maximum absolute value of samples K−N to K−1 (step 42 of FIG. 5).
2. Find the future maximum (FMAX) which is defined as the maximum absolute value of samples K to K+N−1 (step 42). This step can precede, follow or be simultaneous with step 1, above.
3. Find the lesser of the two maximums (LESSMAX) which is the smaller of PMAX and FMAX (step 44).
4. The scale factor (SCALE) for the amplitude modulation is LESSMAX multiplied by a factor (which can be preset) representing the desired gain (GAIN) (step 46).

Figure 5:
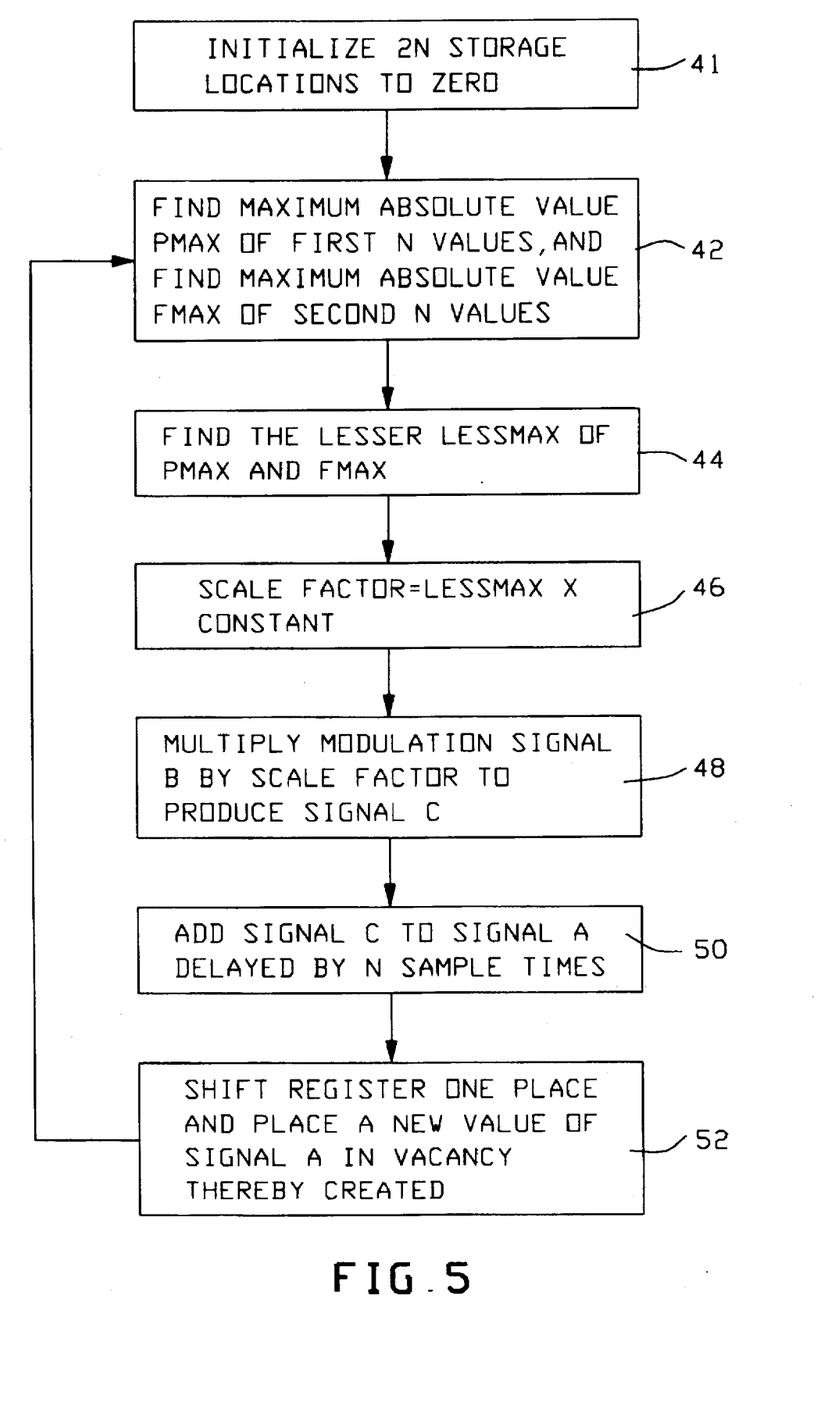
FIG. 5 is a flowchart for computer software implementing the sliding filter of FIG. 3.

Each sample of the spread digital signal from mixer or multiplier 18 is modulated by SCALE (step 48) at mixer or multiplier 24, thereby producing an amplitude tracking sub-audible modulator (ATSAM) waveform which is then added to the delayed digital audio signal at summer 26 (step 50). The digital audio signal provided to summer 26 is delayed by N sample times. This method is illustrated in FIG. 5. The resultant signal produced by summer 26 is then digital-to-analog converted by D/A convertor 20 for use as the combined audio signal. The values in register 36 are then shifted, a new digital audio value or sample is inserted into location K+N−1 of register 36, and processor 38 determines the scale factor; this sequence can be repeated as long as there is more data to be provided to register 36. Thus, location K−N is the most delayed location in register 36, while location K+N−1 is the least delayed location. The audio signal provided to summer 26 is delayed (by delay 25) by N sample intervals, clock cycles or shift intervals, which is half of the size or length (2N) of register 36 or 39. This delay of the audio signal allows the filters of FIGS. 3 and 4 to in effect look ahead. Storing the audio signal in register 36 or 39, while delaying 25 the audio signal provided to summer 26, allows apparatus 29 and apparatus 30 to have the effect that the delayed audio signal's future is the past of the undelayed audio signal as stored by register 36 or 39. Since valid data usually cannot be taken prospectively, delaying the digital audio signal from A/D converter 12 by half (N) the total number (2N) of locations used in (or half the length of) register 36 (or register 39) enables that register to provide data (at locations K+1 through K+N−1) which is later than (is less delayed than) the digital audio signal provided to summer 26. Filter 29 or 30 thereby can both look ahead and behind on the digital audio signal from A/D converter 12, providing automatic gain control in the digital filter without perceptible delay.

As shown in FIG. 3, in apparatus 29 samples or digital values enter one end (location K+N−1) of shift register or buffer array 36 with zero delay. Each time that a new sample or value is placed in the register, the other samples or values in that register are shifted one place to make room for the new entry. As the values in register 36 are shifted (step 52 of FIGS. 5 and 6; step 54 of FIG. 7; step 94 of FIG. 8), values in register 36 locations distant from that end of the register, have greater delay than values closer to that end. Thus, the sample (for an analog or digital signal) or digital value (for a digital signal) at register 36 location K+N−1 has zero delay, while the sample or value at the opposite location K−N has a delay of 2N times the sample time interval, the clocking interval or the shifting interval.

Gain factor generator 22 can alternatively be implemented by the apparatus 30 shown in FIG. 4. Apparatus 30 includes a plurality of (2N) sample/hold devices 32(K−N), . . . 32(K−1), 32K, . . . 32(K+N−1). Placed at the input to each but one sample/hold 32(K−N), . . . 32(K+N−2) is a corresponding delay 34(K−N), . . . 34(K+N−2). Each delay 34 has the same value (preferably equal to one sample time or delay), so that the various sample/hold devices 32 each sample and hold a different portion of the digitized signal produced by A/D convertor 12. Sample/hold devices 32(K+1) through 32(K+N−1) determine future (prospective) values of the signal produced by A/D convertor 12. Each sample/hold device 32 samples and holds the value of the signal produced by A/D convertor 12 at a different time. As time advances, that signal can be resampled. Alternatively and preferably (as shown in FIG. 3, in the software below and in step 52 of FIGS. 5 and 6), the previous samples are then treated as if they had each been sampled one increment earlier than they originally had, with the previous K−N value being dropped and a new measurement being taken for the K+N−1 value (step 52 of FIGS. 5 and 6). The values held in each sample/hold device 32 are provided to and held in a register 39, and are then received and processed by processor 38 in the following manner to produce the time varying gain factor SCALE. Register or buffer 39 can be similar in arrangement to register or buffer 36, but here need not be a shift register. The preferred method for computing the scale factor using the apparatus of FIG. 4 is as follows:

1. Find the previous maximum (PMAX) which is defined as the maximum absolute value of samples K−N to K−1 (step 42 of FIG. 6).
2. Find the future maximum (FMAX) which is defined as the maximum absolute value of samples K to K+N−1 (step 42). This step can precede, follow or be simultaneous with step 1, above.
3. Find the lesser of the two maximums (LESSMAX) which is the smaller of PMAX and FMAX (step 44).
4. The scale factor (SCALE) for the amplitude modulation is LESSMAX multiplied by a factor (which can be preset) representing the desired gain (GAIN) (step 46).

Figure 6:
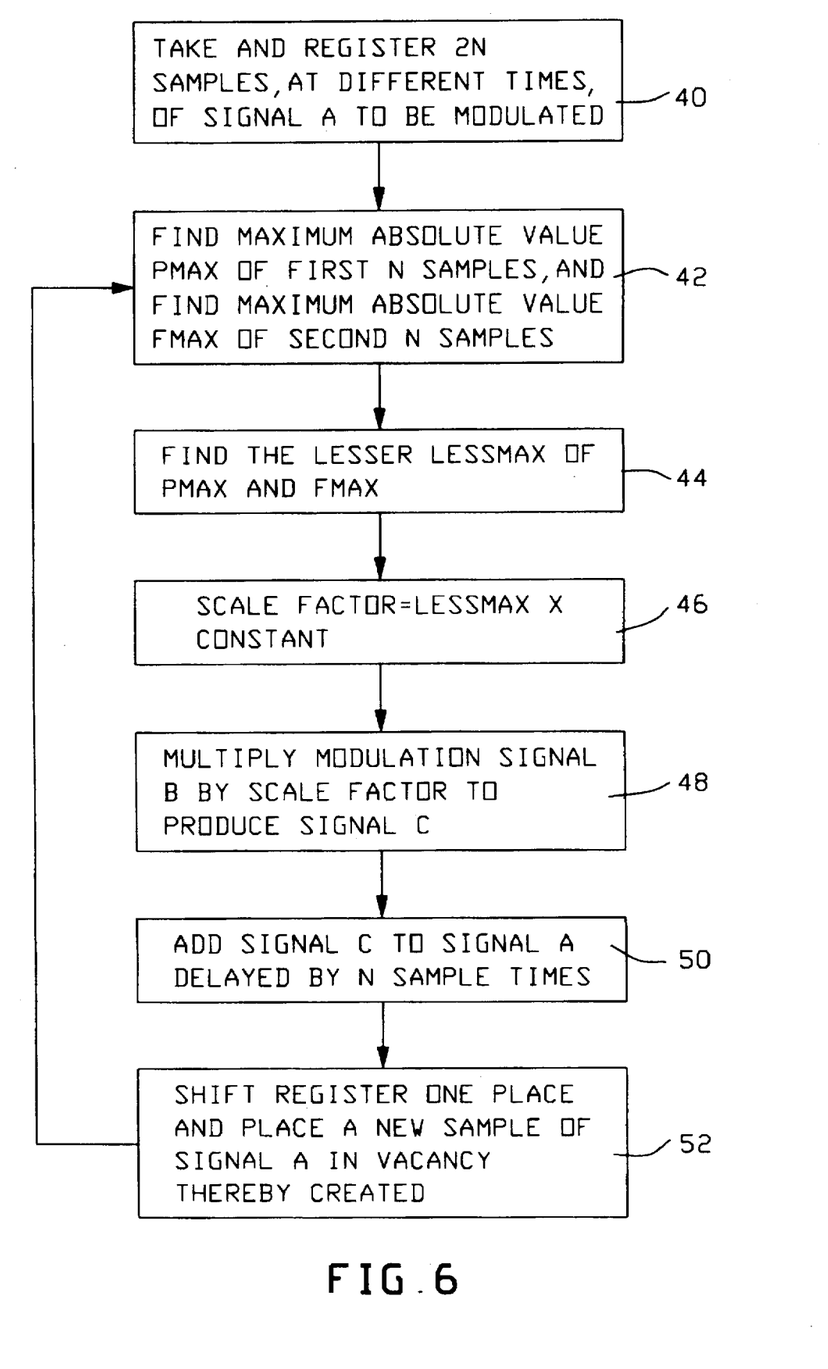
FIG. 6 is a flowchart for computer software implementing the sliding filter of FIG. 4.

Each sample of the spread digital signal from mixer or multiplier 18 is modulated by SCALE (step 48) at mixer or multiplier 24, thereby producing an amplitude tracking sub-audible modulator (ATSAM) waveform which is then added to the delayed digital audio signal at summer 26 (step 50). The digital audio signal provided to summer 26 is delayed by N clocking or sample times. This method is illustrated in FIG. 6. The resultant signal produced by summer 26 is then digital-to-analog converted by D/A convertor 20 for use as the combined audio signal.

In FIG. 4, each delay 34 is preferably equal to one sample delay. Samples come in to apparatus 30 one at a time. All stored sample values are initialized with a value of zero, to indicate that signal values are not yet present in those locations of the register. The first received sample is placed in the bottom (location K+N−1) of the sample/hold devices 32 and of the register 39, and moves up one place in sample/hold devices 32 and thus in register 39 each time that a new sample is to be added.

The methods of FIGS. 5, 6 and 7 each vary the level of the digitized modulation to stay below the analog signal by a constant amount. This constant Modulation to Signal Ratio (MSR) is the steady state ratio of the digital modulation power to the analog signal power and can be expressed in dB. From the MSR, the digitized modulation level can be computed using the following formula:

$$\text{level} = 10^{(MSR/20)}$$

The desired digitized modulation level can be chosen by the user to match the application. It is essentially the volume control for the digital modulation. The modulation level can be instead determined experimentally from any of the methods of FIGS. 5, 6 or 7 by starting the level at a low value, increasing the value of the level until the modulation can be heard, and then decreasing that value until the modulation can no longer be detected.

Although a register or buffer 36 is illustrated in FIG. 3, it is preferred that a processor or computer, acting as if it were a shift register, be used for this purpose instead of a shift register, to provide greater capacity.

The above method of FIG. 6 can be implemented as a computer program. An array of 2N elements needs to be allocated. As an example, if N is 100, the array is first declared as:

float array (200);

The array is initialized with 200 input points of the original signal (step 40) and the modulation is initialized with a single modulation value m.
PMAX can then be calculated as follows (step 42):

```
PMAX = array(0);
for(i = 0; i < 100; i++){
    if(abs(array(i)) > PMAX)PMAX = abs(array(i)),
}
```

In a similar manner FMAX can be calculated (step 42).

```
FMAX = array(100);
for(i = 100; i < 200; i++){
    if(abs(array(i)) > FMAX)FMAX = abs(array(i));
}
```

LESSMAX can then be computed (step 44).
  if (PMAX<FMAX)LESSMAX=PMAX;
  else LESSMAX=FMAX;
An initial value of GAIN is used to determine the level of the modulation. This value is changed experimentally until it is set to be just below the level where the modulation creates a noticeable degradation to the original signal. The scale factor is computed as follows (step 46):
  SCALE=GAIN*LESSMAX;
The output value y is then computed from the original signal, the scale factor and the modulation value m (step 50).
  y=array(100)+SCALE * m;
The values in the array are then shifted to the right (step 52).

```
for(i = 198; i > 0; i--){
    array[i + 1] = array[i];
}
```

The next input value from the original signal is then loaded into array [0] and the next modulation value is loaded into m. The process beginning with the calculation of PMAX is then repeated (steps 42–52) until the entire modulation has been transmitted.

As indicated above, this method, and gain factor generator 22, can be implemented in software. A preferred example of such software, in the C language, is given below.

```
#include <stdio.h>
#include <math.h>
#define MXDEL 50 /* the maximum delay in the filter */
/* This subroutine generates an audio output with a
       digital modulation added to it */
/* The output is delayed MXDEL samples from the input */
int audio_out = atsam(audio_in, digital_in, level, *buffer)
int audio_in; /* a digitized sample of the audio input */
int digital_in; /* a digital modulation sample (either 1 or
−1) */
float level;   /* the digital modulation level */
int *buffer;   /* a pointer to a 2*MXDEL+1 element buffer */
{
    int i;
    int *bufpt1, *bufpt2;
    int previous_peak, future_peak, lower_peak;
    /* shift the position of each value in the buffer array
       by one place */
    bufpt1 = buffer;
    bufpt2 = buffer+1;
    for(i=0; i<2*MXDEL; i++)  *bufpt1++ = *bufpt2++;
    /* add the new audio sample to the buffer */
    *bufpt1 = audio_in;
    /* find the peak of the previous values */
    bufpt1 = buffer;
    previous_peak = 0;
    for(i=0; i<MXDEL; i++) {
        if(abs(*bufpt1++) > previous_peak)  previous_peak =
*(bufpt1−1);
    }
    /* find the peak of the future values */
    bufpt1 = buffer+MXDEL+1;
    future_peak = 0;
    for(i=0; i<MXDEL; i++) {
        if(abs(*bufpt1++) > future_peak)    future_peak =
*(bufpt1−1);
    }
    /* find the lower peak */
    if(previous_peak   <   future_peak)    lower_peak    =
previous_peak;
    else lower_peak = future_peak;
    /* scale the digital_in value, add it to the delayed
       input, and output the result */
    bufpt1 = buffer+MXDEL;
    audio_out = *bufpt1 + level*lower_peak*digital_in;
    return(audio_out);
}
Copyright © 1995 by Unisys Corporation
```

Figure 7:
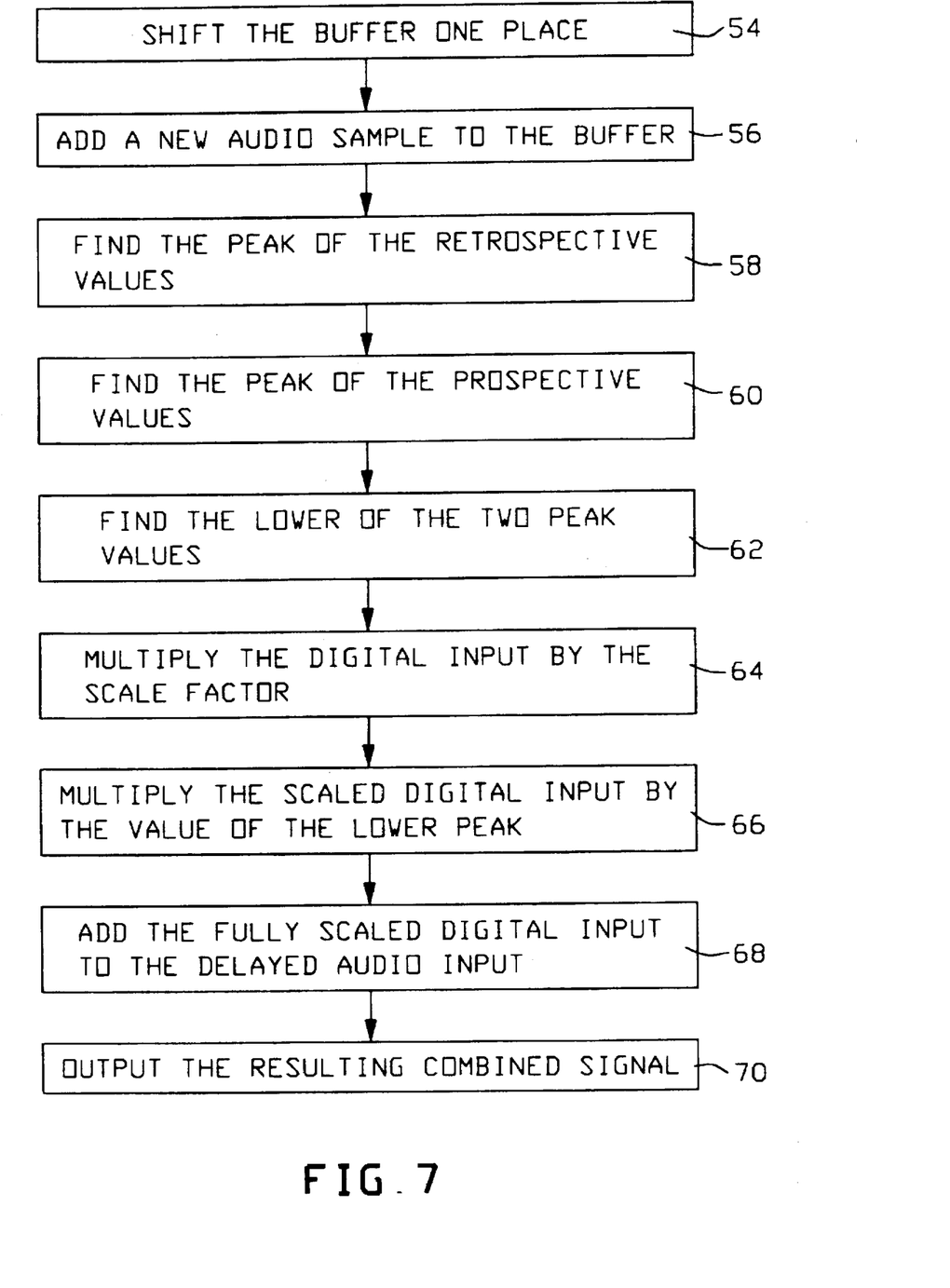
FIG. 7 is a more detailed flowchart for a portion of computer software implementing the sliding filter of FIG. 3 or FIG. 4.

A flowchart for a key portion of the above software implementation is shown in FIG. 7. The process shown in FIG. 7 is executed once for each clock or sample interval. As shown in FIG. 7, at step 54 the buffer is (or, the values in the buffer are) shifted leftward or up one place. At step 56, a new digital audio value or sample is added to the buffer in the location vacated by the shift of step 54.

At step 58, the peak or maximum value of the first N+1 audio samples or digital values (also referred to as the past or previous samples or digital values) is determined. At step 60, the peak or maximum value of the last N−1 input audio samples or digital values (also referred to as the future or delayed samples or values) is determined. Step 60 can precede, follow or be simultaneous with step 58, provided that steps 58 and 60 both precede step 62. At step 62, the lesser of the peak of step 58 and the peak of step 60 is determined. The digital input value, to be used to modulate the audio signal, is multiplied by the scale factor. This scale factor is used to keep the amplitude of the audio signal, and the amplitude of the signal used to modulate the audio signal, at least similar. At step 66, the resulting scaled digital input from step 64 is multiplied by the lower peak found in step 62. The resulting fully scaled digital input from step 66 is then added (step 68) to the delayed audio input. At step 68, the value of the modulated audio signal (the audio output with the digital modulation applied to it) is thus determined. The resulting combined signal is then produced at step 70. The software then returns to step 54.

An alternative software implementation in the C language, which also computes the power ratio used to set the digital modulation factor, is given below.

```
#include <stdio.h>
#include <math.h>
#define MXDEL 50 /* the maximum delay in the filter */
/* This subroutine generates an audio output with a
    digital modulation added to it */
/* The output is delayed MXDEL samples from the input */
int audio_out = atsam(audio_in, digital_in, ratio,
*buffer)
int audio_in;   /* a digitized sample of the audio input
*/
int digital_in; /* a digital modulation sample (either 1
or −1) */
float level;    /* the signal to modulation power ratio */
int *buffer;    /* a pointer to a 2*MXDEL+1 element buffer
*/
{
    int i;
    float level;
    int *bufpt1,*bufpt2;
    int previous_peak, future_peak, lower_peak;
    /* compute the level for the modulation */
    level = sqrt(1.0/ratio);
    /* shift  the position of each value in the buffer
array by one place */
    bufpt1 = buffer;
    bufpt2 = buffer+1;
    for(i=0; i<2*MXDEL; i++) *bufpt1++ = *bufpt2++;
    /* add the new audio sample to the buffer */
    *bufpt1 = audio_in;
    /* find the peak of the previous values */
    bufpt1 = buffer;
    previous_peak = 0;
    for(i=0; i<MXDEL; i++) {
        if(abs(*bufpt1++) > previous_peak) previous_peak =
*(bufpt1−1);
    }
    /* find the peak of the future values */
    bufpt1 = buffer+MXDEL+1;
    future_peak = 0;
    for(i=0; i<MXDEL; i++) {
        if(abs(*bufpt1++) > future_peak) future_peak =
*(bufpt1−1);
    }
    /* find the lower peak */
    if(previous_peak < future_peak) lower_peak =
previous_peak;
    else lower_peak = future_peak;
    /* output the value */
    bufpt1 = buffer+MXDEL;
    audio_out = *bufpt1 + level*lower_peak*digital_in;
```

```
    return(audio_out);
}
Copyright © 1995 by Unisys Corporation
```

Figure 8:
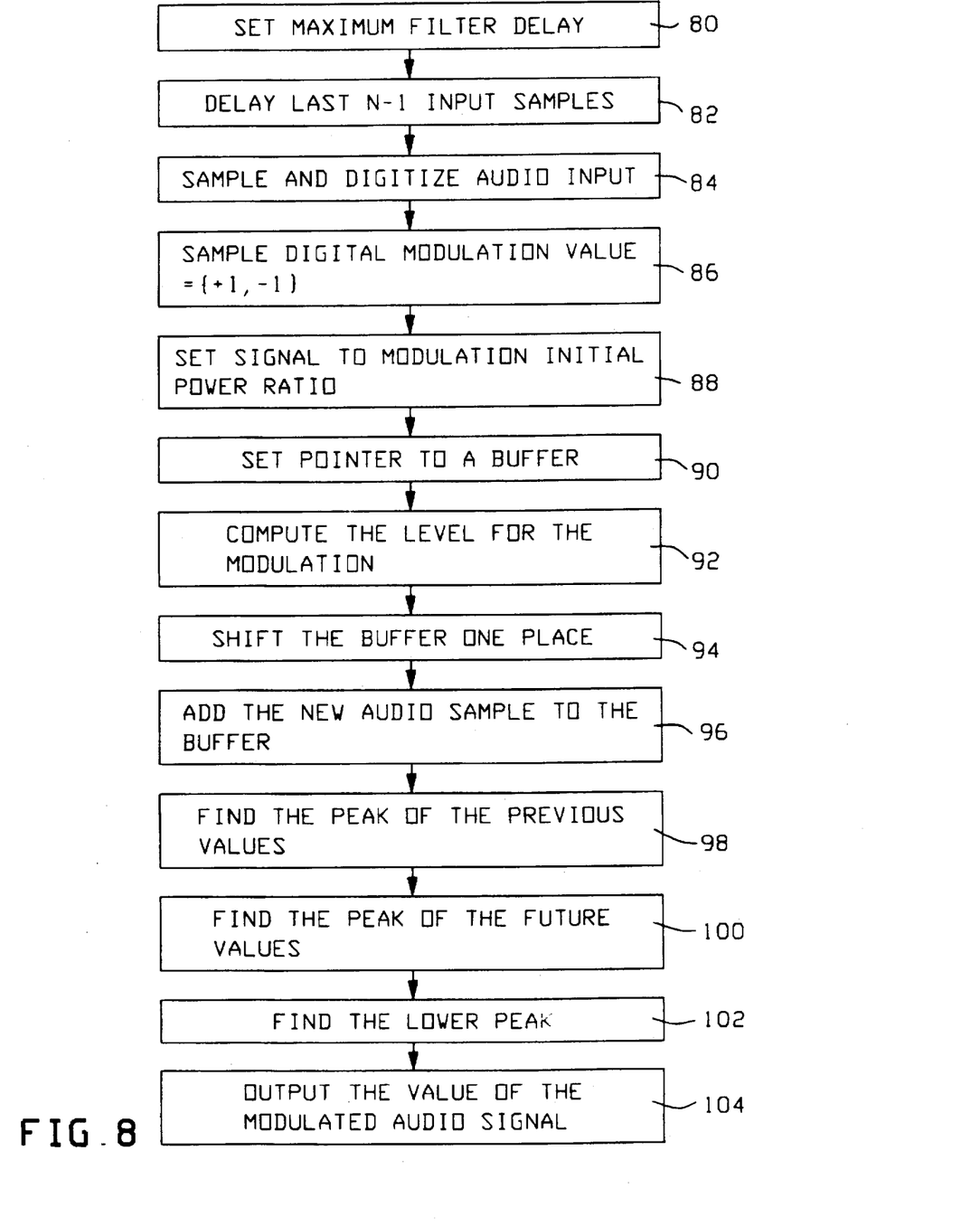
FIG. 8 is a flowchart for alternative software implementing the sliding filter of FIG. 3 or FIG. 4.

A flowchart for the above software implementation is shown in FIG. 8. As shown in FIG. 8, initially at step 80 the maximum filter delay for the last N−1 input samples is set. At step 82, individual delays are determined for each of those last N−1 input samples. At step 84, the audio input is sampled and digitized. At step 86, the digital modulation value is sampled; this value can here only be either +1 or −1. At step 88, the initial signal to modulation power ratio is set. At step 90, a pointer is set to a buffer containing a set of audio input samples. At step 92, the level for the modulation signal is determined by finding the square root of the inverse of the ratio of step 88. At step 94, the buffer identified by the pointer is shifted rightward one place. At step 96, a new audio sample is added to the buffer in the location vacated by the shift of step 94. At step 98, the peak or maximum value of the first N+1 audio samples (also referred to as the past or previous sample values) is determined. At step 100, the peak or maximum value of the last N−1 input samples (also referred to as the future or delayed values) is determined. Step 100 can precede, follow or be simultaneous with step 98, provided that steps 98 and 100 both precede step 102. At step 102, the lesser of the peak of step 98 and the peak of step 100 is determined. At step 104, the value of the modulated audio signal (the audio output with the digital modulation applied to it) is determined. The software then returns to step 90.

However, it is not necessary that the level calculation be performed each time that the above routine is called; such repeated calculation of the level may introduce delay, depending on the speed of the processor used. Instead, the level calculation need only be determined once for each audio signal-modulation signal pair. The routine would then be repeated beginning with the buffer shift step, until the entire audio signal has been modulated, without recomputing the desired digital signal level each such time.

Another alternative software implementation in the C language, which also generates the PN code used to spread the digital modulation signal, is given below.

```
#include <stdio.h>
#include <math.h>
#include <time.h>
#define FILT 1000
#define SAMP 8
#define MXDEL 50
/* generates a pn code, sets the level to correspond to
the input source, and then adds it to the input source */
void srand48();
double drand48();
long seed;
struct tm *time_pointer;
time_t time1;
short int block[SAMP*FILT],*block_pt;
short int block_out[SAMP*FILT],*block_out_pt;
short int mxblk[2*MXDEL+1], *mxblk_end, *mxblk_pt1,
*mxblk_pt2, *mxblk_pt3;
int mx, mx1, mx2;
main (argc, argv)
int argc;
char *argv[];
{
    int i,j, i1;
    int f_in, f_out;
    int code1[FILT], nread, nbytes, nsamp, nblk, l1;
```

-continued
```
         double pn_level, val, sum2, sum1, sigen, ratt, level;
         int mxlen, mxread;
         if(argc != 4) {
             fprintf(stderr, "Usage: %s file_in file_out
         pn_level\n",argv[0]);
             exit(0);
         }
         f_in = open(argv[1],0);
         f_out = creat(argv[2],0664);
         printf("f_in=%d, f_out = %d\n", f_in,f_out);
         pn_level = atof(argv[3]);
    /* time1 = time(NULL);
         time_pointer = localtime(&time1);
         seed = time_pointer->tm_sec*100 + time_pointer->tm_min;
         fprintf(stderr, "seed = %d\n",seed); */
         seed = 779;  /* set random seed for repeatability */
         srand48(seed);
    /* generate the random code */
         for(i=0; i<FILT; i++) {
             val = drand48();
             if(val>0.5) code1[i] = 1;
             else code[i]=-1;
         }
         nread = SAMP*FILT*sizeof(short int);
         ratt = pow(10.,pn_level/10.);
         ratt = sqrt(ratt);
    /* set the level for the pn signal to be pn_level dB
    relative to the source */
         mxblk_pt1 = mxblk;
         mxlen = 2*MXDEL + 1;
         mxblk_end = mxblk + mxlen -1;
         for(i=0; i<mxlen; i++) *mxblk_pt1++ = 0;
         close(f_in);
         f_in = open(argv[1],0);
    /* read in values to fill the memory buffer */
         mxread = MXDEL*sizeof(short int);
         if(read(f_in,mxblk,mxread) != mxread) {
             fprintf(stderr,"Unable to fill mxread buffer,
    BYE\n");
             exit(1);
         }
         mxblk_pt2 = mxblk + MXDEL;
         while((nbytes=read(f_in,block,nread)) > 0) { \* read a
    block of data */
             nsamp = nbytes/sizeof(short int);
             nblk = nsamp/SAMP;
             block_pt = block;
             block_out_pt = block_t);
             nblk = nsamp/SAMP;
             block_pt = block;
             block_out_pt = block_out;
             for(i=0; i<nblk; i++) {
                 if(code1[i]>0) { \* the encoding signal is
    positive */
                     for(j=0; j<SAMP; j++) {
                         *mxblk_pt2++ = *block_pt++;
                         if(mxblk_pt2 > mxblk_end) mxblk_pt2 = mxblk:
                         mxblk_pt3 = mxblk_pt2;
    /* find the peak of the previous values */
                         mx1 = 0;
                         for (i1=0; i1<MXDEL; i1++){
                             if(abs((int)(*mxblk_pt3++)) > mx1) mx1 =
    abs((int)(*mxblk_pt3-1));
                             if(mxblk_pt3 > mxblk_end) mxblk_pt3 = mxblk;
                         }
                         mxblk_pt1 = mxblk_pt3;
                         mxblk_pt3++;
                         if(mxblk_pt3 > mxblk_end) mxblk_pt3 = mxblk;
    /* find the peak of the future values */
                         mx2 = 0;
                         for(i1=0; i1<MXDEL; i1++){
                             if(abs((int) (*mxblk_pt3++)) > mx2) mx2 =
    abs((int)(*mxblk_pt3-1));
                             if(mxblk_pt3 > mxblk_end) mxblk_pt3 = mxblk;
                         }
    /* choose the lower of the two peaks */
                         if(mx1 > mx2) mx = mx2;
                         else mx = mx1;
    /* add the scaled modulated value to the signal */
                         level = ratt*mx;
                         *block_out_pt++ = *mxblk_pt1 + level;
                     }
                 }
                 else { \* the encoding signal is negative */
                     for(j=0; j<SAMP; j++) {
                         *mxblk_pt2++ = *block_pt++;
                         if(mxblk_pt2 > mxblk_end) mxblk_pt2 = mxblk;
                         mxblk_pt3 = mxblk_pt2;
    /* find the peak of the previous values */
                         mx1 = 0;
                         for(i1=0; i1>MXDEL; i1++){
                             if(abs((int)(*mxblk_pt3++)) > mx1) mx1 =
    abs((int)(*(mxblk_pt3-1)));
                             if(mxblk_pt3 > mxblk_end) mxblk_pt3 = mxblk;
                         }
                         mxblk_pt1 = mxblk_pt3;
                         mxblk_pt3++;
                         if(mxblk_pt3 > mxblk_end) mxblk_pt3 = mxblk;
    /* find the peak of the future values */
                         mx2 = 0;
                         for(i1=0; i1<MXDEL; i1++){
                             if(abs((int)(*mxblk_pt3++)) > mx2) mx2 =
    abs((int)(*(mxblk_pt3-1)));
                             if(mxblk_pt3 > mxblk_end) mxblk_pt3 = mxblk;
                         }
    /* choose the lower of the two peaks */
                         if(mx1 > mx2) mx = mx2;
                         else mx = mx1;
    */ add the scaled modulated value to the signel */
                         level = ratt*mx;
                         *block_out_pt++ = *mxblk_pt1 - level;
                     }
                 }
             }
             write(f_out,block_out,nbytes);
         }
         block_out_pt = block_out;
         mxblk_pt1++;
         if(mxblk_pt1 > mxblk_end) mxblk_pt1 = mxblk;
         for(i=0; i<MXDEL; i++) {
             *block_out_pt++ = *mxblk_pt1++;
             if(mxblk_pt1 > mxblk_end) mxblk_pt1 = mxblk;
         }
         write(f_out, block,mxread);
    }
    Copyright © 1994 by Unisys Corporation
```

A/D converter 12 can be eliminated, and an analog signal can be provided to gain generator 22, if a sample/hold device is placed at each data input of register 36 or 39. Such a configuration is shown in FIG. 4. However, instead of placing a separate sample/hold device at each such data input, as shown in FIG. 4, a single sample/hold device could be used to feed delays 34.

A register length of 2N, half for past values and half for what are in effect prospective values, is preferred, with a delay of N for the audio signal before modulation. However, the proportion of past to prospective values in the register can be changed, provided that the delay applied to the audio signal corresponds to the total past intervals or sample times.

It should be understood that the present invention can be used for amplitude tracking and adaptive modulation of varying signals other than audio signals.

As discussed above, a pseudonoise code can be mixed or multiplied with digital data to spread it. The spread signal can then be added to an audio signal at a constant level. For the audio signal not to be degraded, the constant level must be low enough so that the spread signal cannot be heard even when the audio level is low. When using a low constant level, the detection of the digital data is severely constrained. By using the present invention to adaptively vary the level of the spread signal, the average spread signal level can be increased significantly. This increased average spread signal level greatly improves the detectability of the digital data.

Some of the many advantages of the invention should now be readily apparent. For example, apparatus and method have been provided for modulating a sub-audible identification signal while preserving the high dynamic range of the primary audio signal. Sub-audible modulation is thereby performed without perceptible degradation to the primary audio or other signal. The amplitude of the modulation or identification signal is controlled so that interference during intervals of low level audio (quiet) is reduced significantly. More data can be thereby encoded in the sub-audible signal while maintaining no perceptible interference in a high dynamic range audio environment.

Thus, there has been provided apparatus and method for adding an identification or other signal or field to a data signal without perceptibly degrading either such signal. Apparatus and method have also been provided to modulate an identification signal which can then be applied to another signal which the identification signal is intended to identify. Apparatus and method have furthermore been provided to track the amplitude of one signal and to modify or modulate another signal based thereon so that the amplitude of the second signal tracks that of the first signal. Amplitude tracking of one signal is provided to control amplitude of another signal before the two signals are combined to produce a composite signal. A sub-audible identification signal can be modulated without perceptible degradation to the primary audio or other signal with which that identification signal is then to be combined.

Obviously, many modifications and variations of the present invention are possible in light of the above teachings. It is therefore to be understood that the foregoing embodiments are presented by way of example only and that, within the scope of the appended claims and equivalents thereto, the invention may be practiced otherwise than as specifically described.

What is claimed is:

1. A method for modulating a first signal with a second signal such that the amplitude of the second signal does not significantly exceed the amplitude of the first signal at any one time, comprising the steps of:

obtaining a first plurality of values of the first signal, taken at different times, wherein each of said first plurality of values is taken from a different portion of the first signal, said first plurality of values are arranged in a sequence corresponding to the order of the corresponding values of the first signal, and said first plurality of values includes a first portion and a second portion wherein said second portion follows said first portion;

determining the maximum absolute value of all values of said first portion, and the maximum absolute value of all values of the second portion;

determining the lesser of the two maximum absolute values;

determining a scale factor based on the lesser of the two maximum absolute values;

scaling the amplitude of the second signal, using the scale factor, to produce a third signal;

combining the third signal with a delayed first signal, wherein the first signal is delayed by a number of intervals of the values that is equal to the number of values in the first portion.

2. A method as defined in claim 1, wherein the first portion and the second portion each contain the same number of values, wherein the values are taken from the first signal at different successive times, and wherein said combining step comprises combining the third signal with the first signal delayed by the time needed to produce half of the first plurality of values.

3. A method as defined in claim 2, further comprising the steps of:

after said combining step, shifting the values in said first plurality by one place each, dropping the oldest value and adding a new, more recent value of the first signal in the vacancy thereby created in the first plurality; and returning to the step of finding maximum absolute values.

4. A method as defined in claim 1, further comprising the steps of:

after said combining step, shifting the values in said first plurality by one place each, dropping the oldest value and adding a new, more recent value of the first signal in the vacancy thereby created in the first plurality; and returning to the step of finding maximum absolute values.

5. Apparatus for adaptively modulating a first signal with a second signal, comprising:

a first plurality of storage locations, ordered in a sequential series, wherein in response to a clock control signal the content of each of said storage locations is shifted to the next said storage location in the series, deleting the content of the storage location at one end of the series while permitting the location at the opposite end of the series to receive a new value, and wherein said first plurality of storage locations includes first and second portions of said first plurality;

clock control means for providing the control signal to said first plurality of storage locations;

processor means for determining the maximum absolute value of the first N values of said first plurality of storage locations, finding the maximum absolute value of the remaining values of said first plurality of storage locations, finding the lesser of the two maximum absolute values, and producing a scale factor based on the lesser of the two maximum absolute values;

scaling means for scaling the second signal using the scale factor;

a delay for delaying the first signal by an amount proportional to N, where N is an integer; and combining means for combining the scaled second signal with the delayed first signal.

6. Apparatus as defined in claim 5 wherein a shift register comprises said first plurality of storage locations.

7. Apparatus for modulating a first signal with a second signal such that the amplitude of the second signal does not significantly exceed the amplitude of the first signal at any one time, comprising:

means for obtaining a first plurality of values of the first signal, taken at different times, wherein each of said first plurality of values is taken from a different portion of the first signal, said first plurality of values are arranged in a sequence corresponding to the order of the corresponding values of the first signal, and said first plurality of values includes a first portion and a second portion wherein said second portion follows said first portion;

means for determining the maximum absolute value of all values of said first portion, and the maximum absolute value of all values of the second portion;

means for determining the lesser of the two maximum absolute values;

means for determining a scale factor based on the lesser of the two maximum absolute values;

means for scaling the amplitude of the second signal, using the scale factor, to produce a third signal;

means for combining the third signal with a delayed first signal, wherein the first signal is delayed by a number of intervals of the values that is equal to the number of values in the first portion.

8. Apparatus as defined in claim 7, wherein the first portion and the second portion each contain the same number of values, wherein the values are taken from the first signal at different successive times, and wherein said combining means comprises means for combining the third signal with the first signal delayed by the time needed to produce half of the first plurality of values.

9. Apparatus as defined in claim 7, further comprising:

means for shifting the values in said first plurality by one place each, dropping the oldest value and adding a new, more recent value of the first signal in the vacancy thereby created in the first plurality.

10. Apparatus for adaptively modulating a first signal with a second signal, comprising:

a first plurality of storage locations, ordered in a sequential series, wherein said first plurality of storage locations includes first and second portions of said first plurality;

shifting means responsive to a control signal for shifting the content of each of said storage locations to the next said storage location in the series, deleting the content of the storage location at one end of the series while permitting the location at the opposite end of the series to receive a new value;

clock control means for providing the control signal to said shifting means;

processor means for determining the maximum absolute value of the first N values of said first plurality of storage locations, finding the maximum absolute value of the remaining values of said first plurality of storage locations, finding the lesser of the two maximum absolute values, and producing a scale factor based on the lesser of the two maximum absolute values;

scaling means for scaling the second signal using the scale factor;

a delay for delaying the first signal by an amount proportional to N, where N is an integer; and combining means for combining the scaled second signal with the delayed first signal.

* * * * *